(12) United States Patent
Falkner

(10) Patent No.: US 6,413,423 B1
(45) Date of Patent: Jul. 2, 2002

(54) LIQUID TREATMENT APPARATUS WITH BACKWASH FLOW CONTROL VALVE

(76) Inventor: Kemp E. Falkner, 3888 N. Ponce De Leon, St Augustine, FL (US) 32084

( * ) Notice: Subject to any disclaimer, the term of this patent is extended or adjusted under 35 U.S.C. 154(b) by 0 days.

(21) Appl. No.: 09/550,936

(22) Filed: Apr. 17, 2000

(51) Int. Cl.[7] .............................................. B01D 24/00
(52) U.S. Cl. ...................... 210/269; 210/275; 210/278
(58) Field of Search .......................... 210/269, 275–279

(56) References Cited

U.S. PATENT DOCUMENTS

| | | | |
|---|---|---|---|
| 1,662,620 A | 3/1928 | Patelski | |
| 1,789,390 A | 1/1931 | Potteiger | |
| 2,755,662 A | 7/1956 | Shelton | 68/184 |
| 2,834,368 A | 5/1958 | Gray | 137/271 |
| 3,059,702 A | 10/1962 | Hebert | 169/37 |
| 3,770,013 A | 11/1973 | Thompson | 137/606 |
| 4,560,144 A | 12/1985 | Williams | 25/344 |

OTHER PUBLICATIONS

US Trademark Reg. No. 0804939 for the mark BIRM for chemicals for removing iron and manganese from water (Owner: Clack Corporation).*
BIRM Specification sheet. Date unknown, but prior to Applicant's invention.

* cited by examiner

Primary Examiner—Chester T. Barry
(74) Attorney, Agent, or Firm—Charles M. Kaplan

(57) ABSTRACT

Apparatus for treating water utilizes a single flow control valve that has only one moving part to divert treated water from several water treatment units to backwash another water treatment unit.

20 Claims, 9 Drawing Sheets

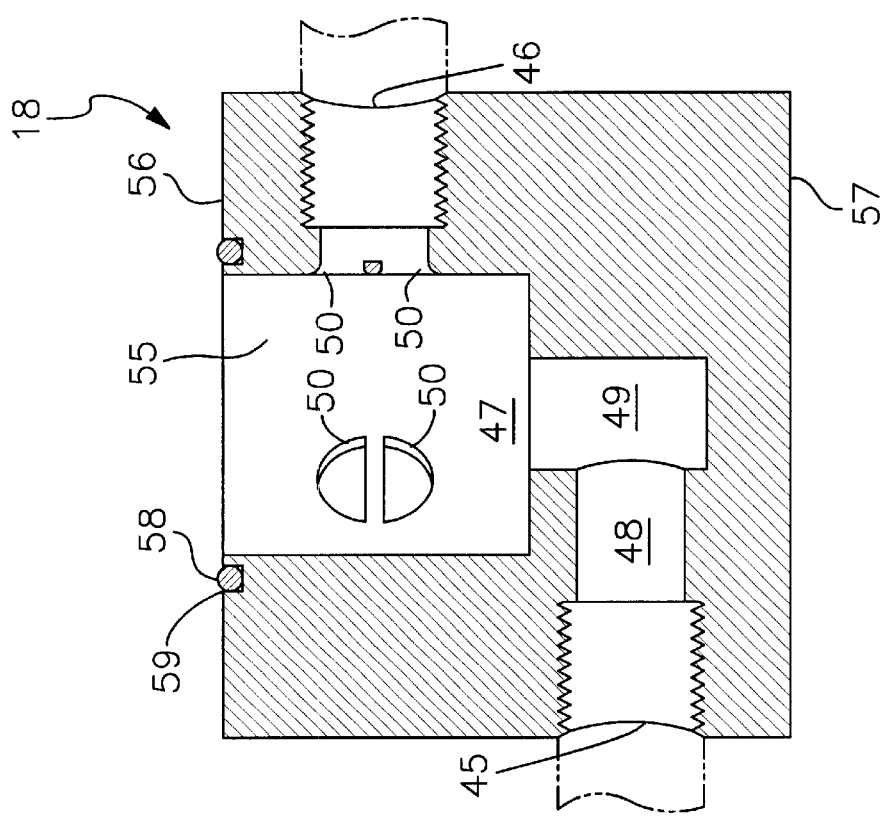
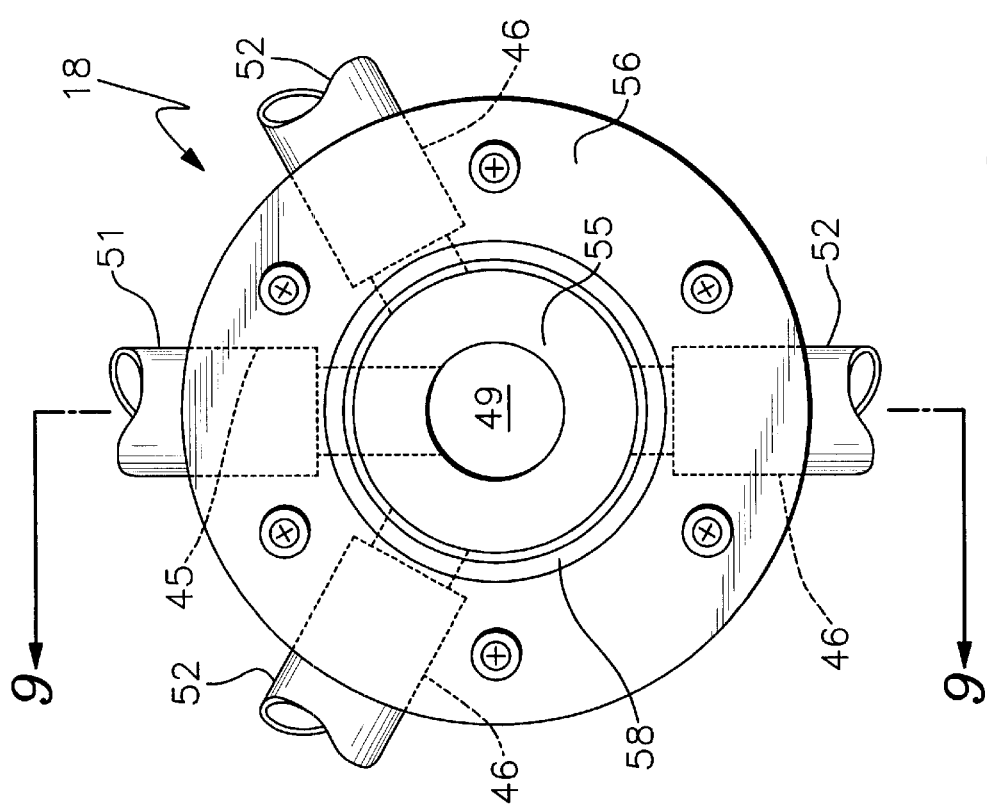
Fig. 9
Fig. 8

LIQUID TREATMENT APPARATUS WITH BACKWASH FLOW CONTROL VALVE

BACKGROUND OF THE INVENTION

This invention relates to liquid treatment apparatus, and more particularly to controlling the backwash flow among filters that remove iron from potable water.

OBJECTIVES OF THE INVENTION

Accordingly, it is an object of this invention to provide improved liquid and water treatment apparatus.

Another object is to provide flow control valves that selectively direct or channel treated water for backwashing a selected one of a number of filters.

An additional object is to control with a single valve the flow of backwash water between several filters.

Another object is to provide an integral flow control valve that has only one moving part for diverting backwash water flow among multiple water treating units.

A further object is to provide flow control valves that are durable, relatively economical, easy to use and service, and which do not possess defects found in similar prior art valves.

Other objects and advantages of the liquid and water treating apparatus and the valves incorporating this invention will be found in the specification and claims and the scope of the invention will be set forth in the claims.

DESCRIPTION OF THE DRAWING

FIG. 8 is a top plan view of the collection chamber module.

FIG. 9 is a cross sectional view taken along the line 9—9 in FIG. 8.

DESCRIPTION OF THE INVENTION

Figure 1:
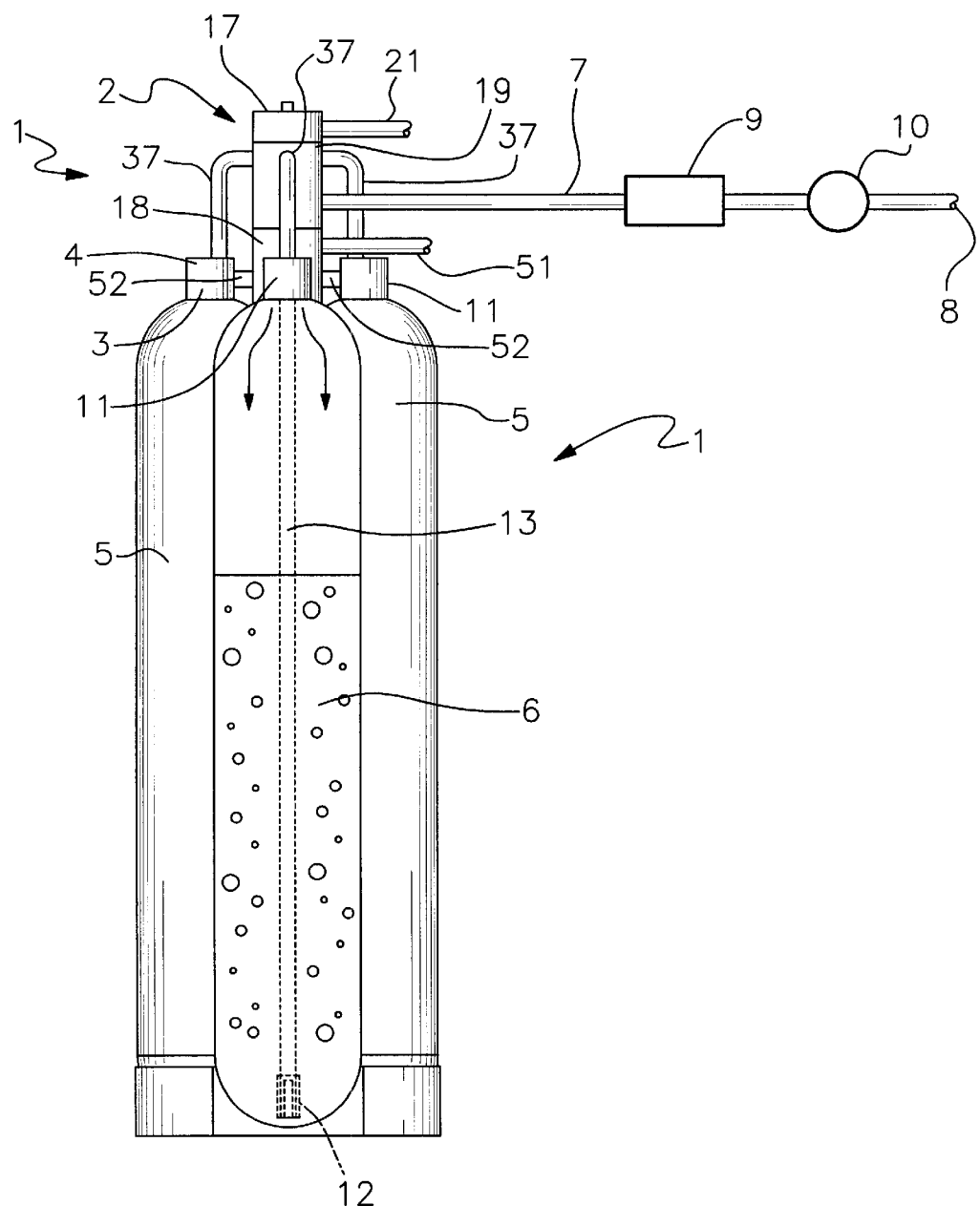
FIG. 1 is a schematic partially cross sectional, side view of water treatment apparatus in accord with this invention.

The drawing shows apparatus 1 for treating liquids that includes a single unitary flow control valve 2 in accord with this invention connected to control the backwash water flow among several parallel connected liquid treatment units. A preferred embodiment of the apparatus 1 has exactly three filter tanks 5 that remove iron form potable water. Each tank 5 contains a bed 6 of about ¾ to 2 cubic feet of Birm® granules. Iron containing potable water from a well or municipal source 8 flows into valve 2 through a supply line 7 after being oxygenated by an aeration blower or venturi 9 and pressurized by a pump 10. To remove iron, the water entering the valve 2 should have a pressure of at least about 40 psi, and the dissolved oxygen content should be at least about 6 ppm. The preferred three tank filtering apparatus will effectively remove iron at concentrations up to about 20 ppm from potable water for residential and small business use, and provide up to about 5–15 gpm at peak flow at a service pressure of about 40–75 psi.

When the service cycle begins, the valve 2 divides the incoming pressurized and oxygenated untreated iron containing water into essentially equal flow volumes that enter each filter tank 5 through an untreated liquid inlet 3 in its top 11. The untreated water flows through the bed 6 of Birm granules in each tank 5 where the iron precipitates, and the precipitated solid particles are filtered out by the bed 6. The iron free treated water enters a strainer 12 at the bottom of an effluent pipe 13 in each tank. The treated effluent flows out of the filter tanks 5 through their pipes 13 to a treated liquid outlet 4 in top 11, and the effluent is collected in and disbursed by valve 2.

The valve 2 is made from three rigid right circular cylindrical hollow plastic modules that are connected together by nuts 15 screwed on several peripherally spaced threaded rods 16 that pass through all of the valve modules. A drain module 17 is located at one end of the valve 2, a treated liquid collection module 18 is located at the opposite end of the valve, and an untreated liquid distribution module 19 is located between modules 17 and 18.

Figure 4:
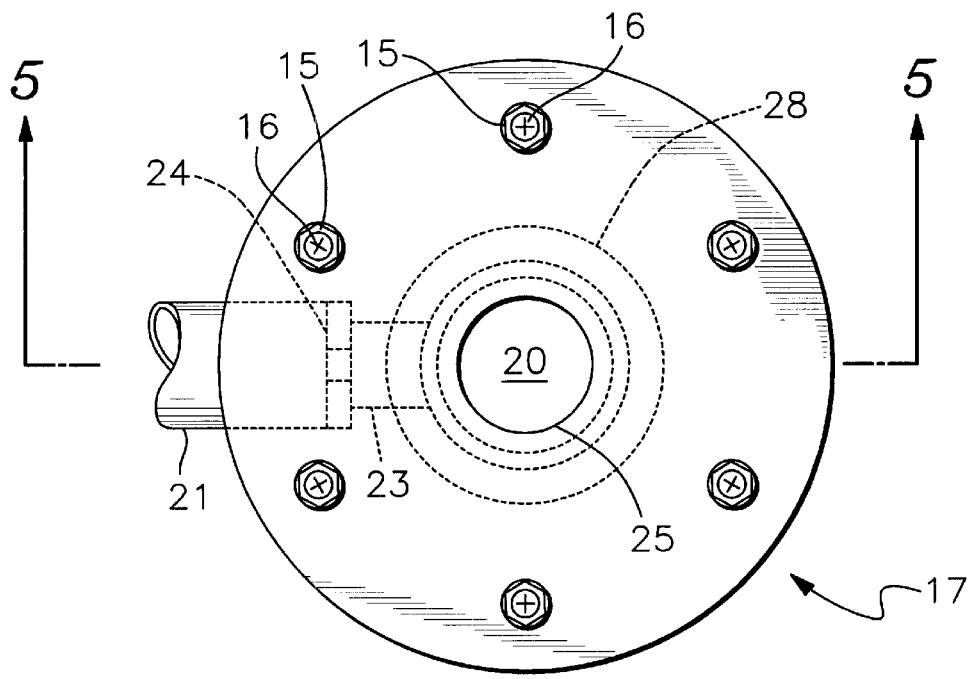
FIG. 4 is a top plan view of the drain chamber module
Figure 5:
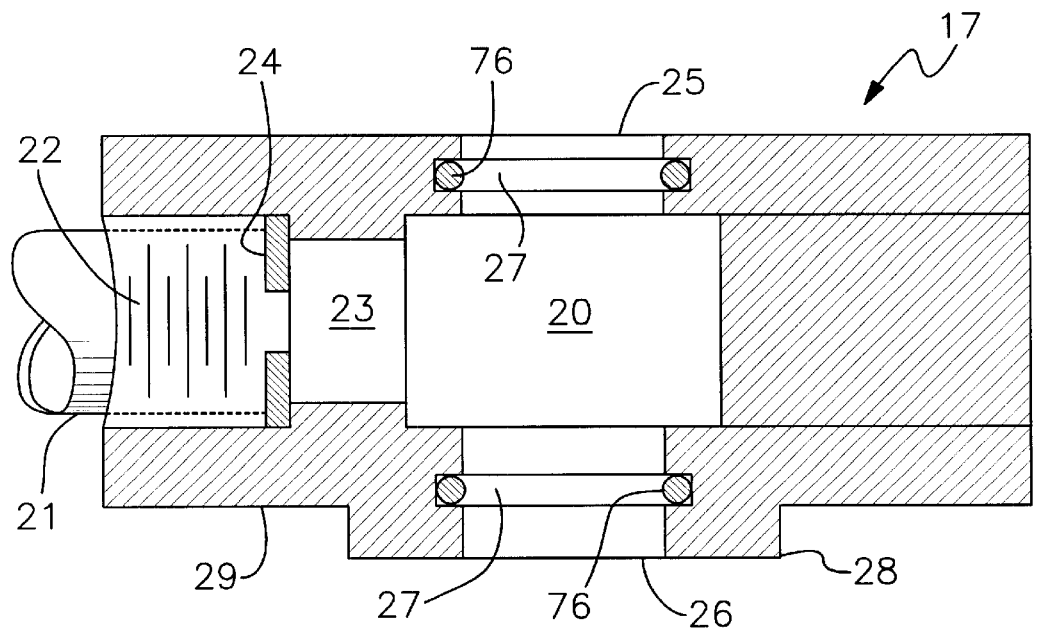
FIG. 5 is an enlarged cross sectional view of the drain chamber module taken along the line 5—5 in FIG. 4.

As shown in FIGS. 4 and 5, the drain module 17 has a cylindrical drain chamber 20 at its center. A drain pipe 21 is threaded into a drain outlet port 22 that communicates with chamber 20 through a hole 23. Drain pipe 21 connects the valve 2 to a waste disposal site such as a sewer line that is at essentially atmospheric pressure. The chamber 20 has essentially the same atmospheric pressure as the drain pipe 21. A doughnut shaped drain pipe flow control restrictor 24 is located between the end of pipe 21 and hole 23. Restrictor 24 controls the drain outlet flow through pipe 21 to the required backwash rate of flow (e.g. about 4–10 gpm) for the size of tank 5 and bed 6 being backwashed. Aligned circular upper and lower bearing holes 25 and 26 are concentric with chamber 20, and O-ring retainer grooves 27 surround the bearing holes. A cylindrical hub 28 protrudes from the one or bottom end 29 of the module 17.

Figure 7:
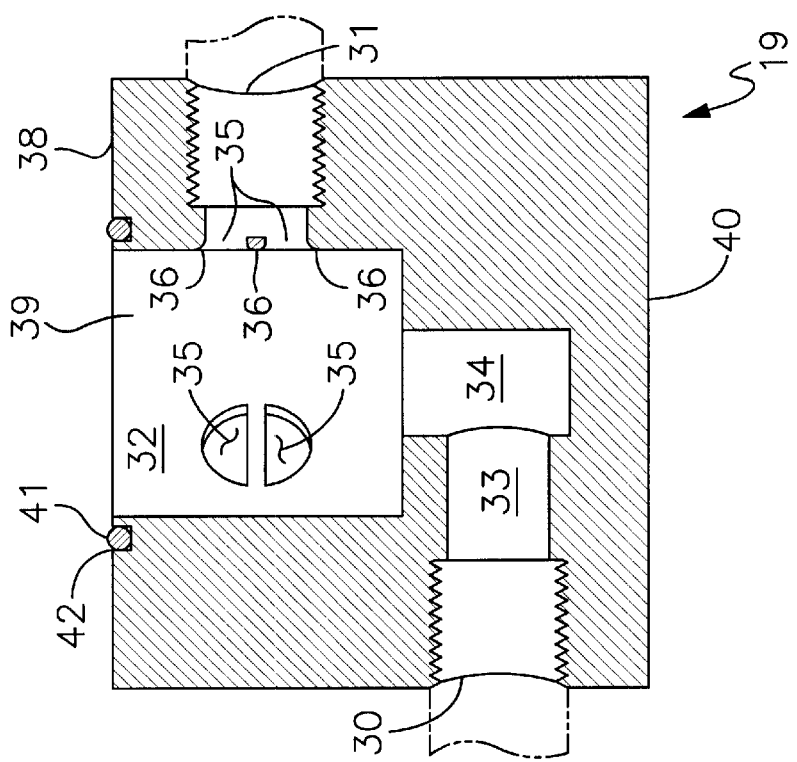
FIG. 7 is a cross sectional view taken along the line 7—7 in FIG. 6.
Figure 6:
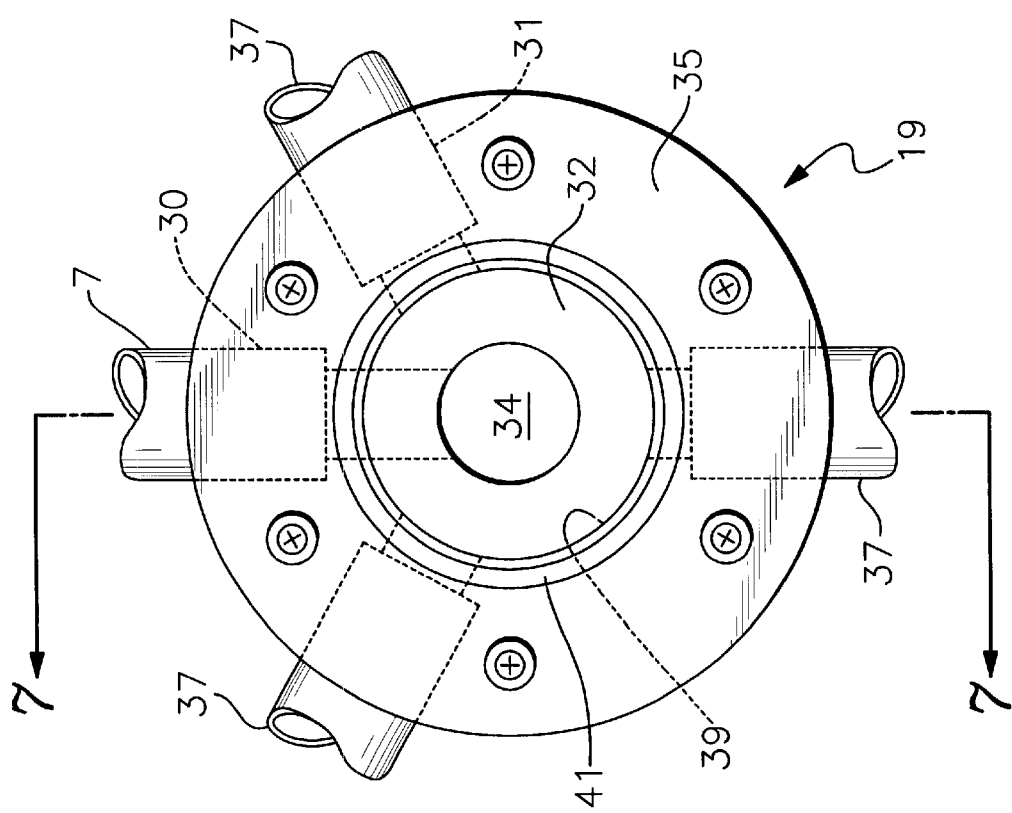
FIG. 6 is a top plan view of the distribution chamber module.
Figure 13:
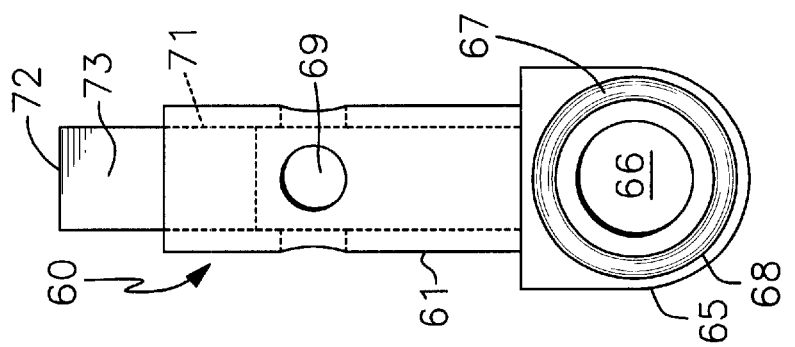
FIG. 13 is a front view of the flow diverter member.
Figure 12:
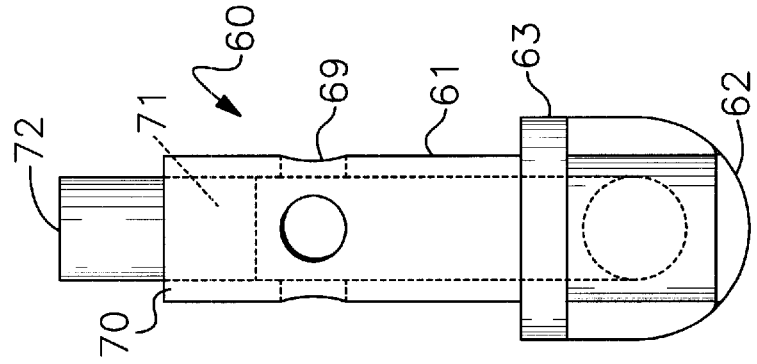
FIG. 12 is a rear view of the flow diverter member.
Figure 11:
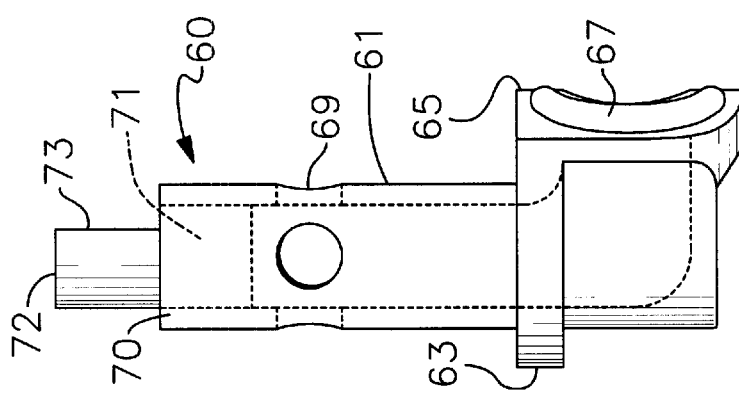
FIG. 11 is a side view of the flow diverter member.
Figure 10:
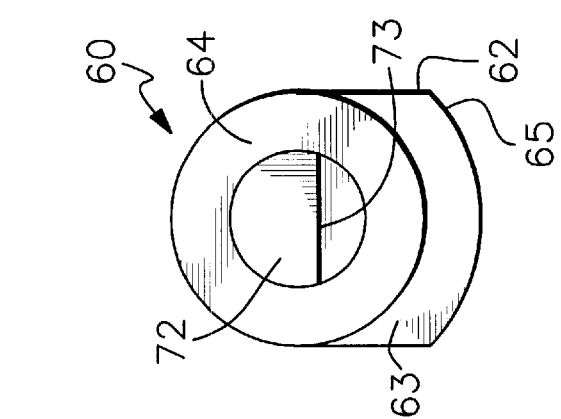
FIG. 10 is an enlarged top plan view of a flow diverter member in accord with this invention.

As shown in FIGS. 6 and 7, the untreated liquid or water distribution module 19 has an untreated liquid inlet port 30. Three liquid distribution ports 31 are evenly spaced around its periphery. The port 30 communicates with untreated liquid distribution chamber 32 through relatively large holes 33 and 34, and each port 31 communicates with chamber 32 through a pair of essentially semi circular holes 35. Untreated liquid supply line 7 is threaded into port 30, and untreated liquid distribution lines 37 are threaded into the ports 31. Untreated liquid distribution chamber 32 opens through the top or one wall 38 of module 19, and is centered in the module. The interior wall surface 39 of chamber 32 has the curvature of a right circular cylinder. The bottom or other wall 40 of the module 19 has a flat unbroken surface. An O-ring 41 in a groove 42 surrounding chamber 32 provides a liquid tight seal for the top wall 38.

The size, shape and structure of treated liquid or water collection module 18 are essentially identical to that of liquid distribution module 19, as shown in FIGS. 8 and 9. The treated liquid collection module 18 has a treated liquid outlet port 45 and three treated liquid collection ports 46 that are evenly spaced around its periphery. The port 45 communicates with treated liquid collection chamber 47 through relatively large holes 48 and 49, and ports 46 communicate through a pair of essentially semi circular holes 50. Treated effluent line 51 is threaded into port 45 and treated liquid collection lines 52 are threaded into the ports 46. Treated liquid collection chamber 55 opens through the the top or one wall 56 of module 18, and is centered in the module. The bottom or other wall 57 of the module 18 has a flat unbroken surface. An O-ring 58 in a groove 59 surrounding chamber 55 provides a liquid tight seal for the top wall 56.

Figure 2:
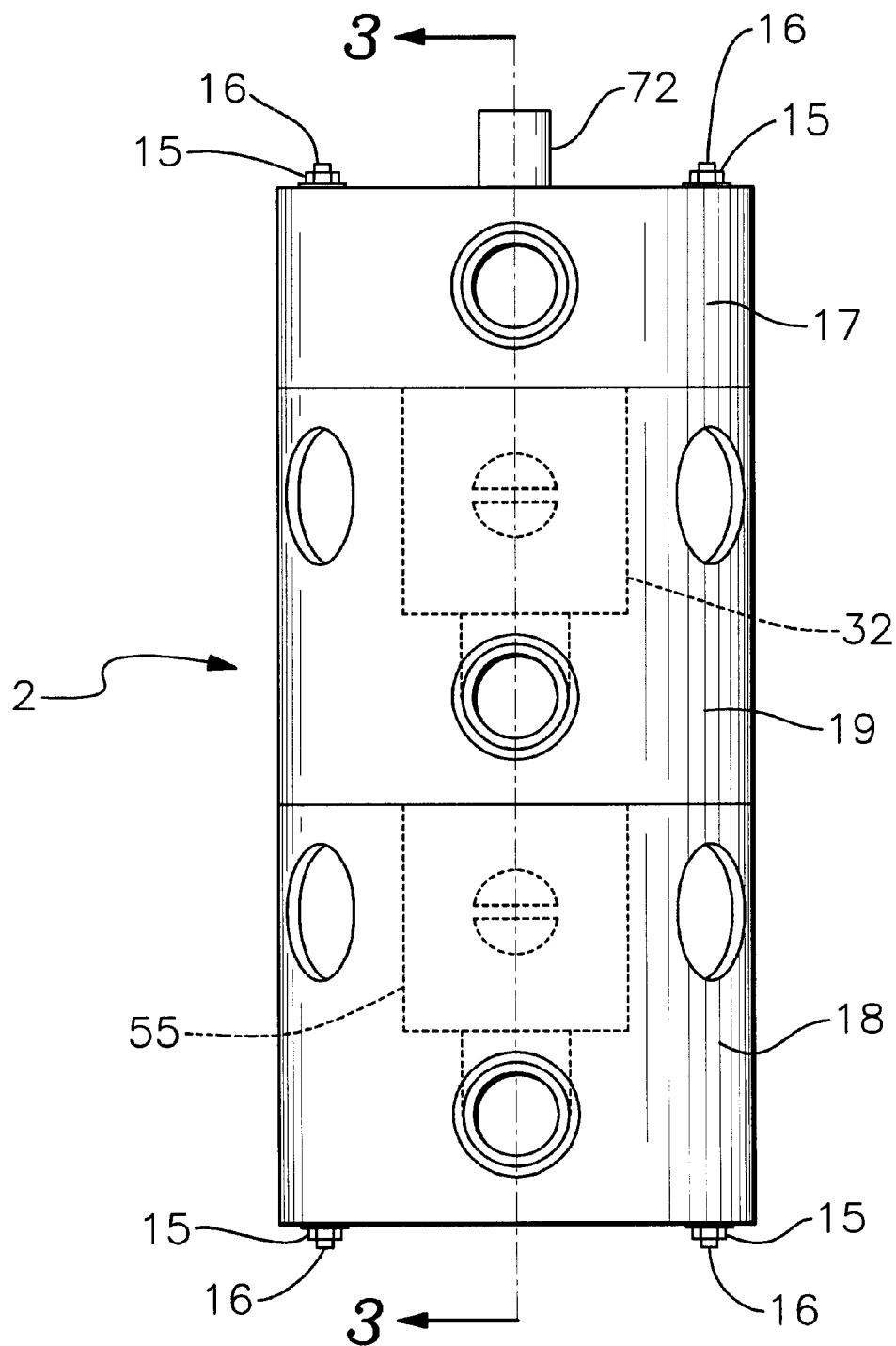
FIG. 2 is side view of the flow control valve shown in FIG. 1.
Figure 3:
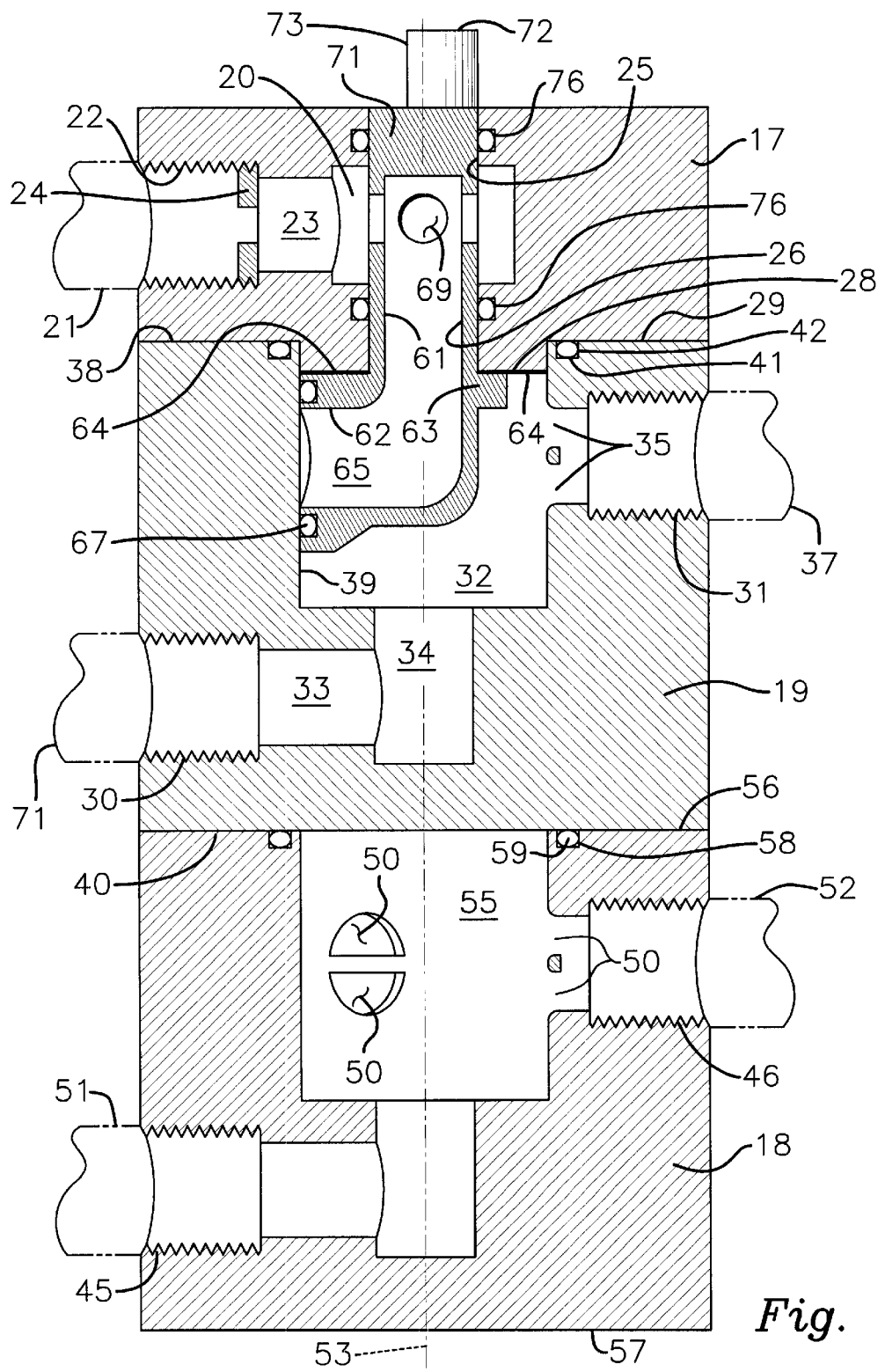
FIG. 3 is an enlarged cross sectional view taken along the line 3—3 in FIG. 2.

When the modules 17, 18 and 19 are assembled as shown in FIGS. 2 and 3, the modules have the same longitudinal central axis 53. The chambers 20, 32 and 55 are also aligned and coincident with the axis 53. The hub 28 of module 17 fits tightly into the top of liquid distribution chamber 32, and O-ring 41 makes a liquid tight seal between the bottom end 29 of module 17 and the top wall 38 of module 19. Bearing holes 25 and 26 are also centered on axis 53. O-ring 58 makes a liquid tight seal between the bottom end 40 of module 19 and the top wall 56 of module 18. The modules 17, 18 and 19 may be made from any durable, non corrodible hard plastic such as polyvinyl chloride or nylon, that does not breakdown in the liquid being treated.

A hollow, tubular, generally L-shaped flow diverter member 60 can be rotated to control the flow of backwash water or other liquid from the filters 5. Flow diverter 60 has a relatively long leg portion 61 and a relatively short foot portion 62. A cylindrical ledge 63 overlies the foot portion, and a flat washer 64 on the ledge surrounds the leg portion. The foot portion 62 has a curved terminal end surface 65 that has a curvature that matches the right circular cylindrical curvature of the interior wall surface 39 of the chamber 32. A circular entrance hole 66 through end surface 65 is dimensioned to surround and encompass both holes 35 of each port 31, and thereby to isolate such port 31. An O-ring 67 in a groove 68 makes a liquid tight seal with surface 39 around hole 66. Leg portion 61 has several spaced holes 69 adjacent its upper end 70. A solid plug 71 fills the end 70. A valve stem 72 that is integral with plug 71 extends from diverter 60. Stem 72 is flattened at 73 to facilitate gripping of the stem by hand or wrench for rotating the diverter 60 to its operating positions. An electrical timer (not shown) may be connected to stem 72 for rotating the diverter 60. Flow diverter member 60 should be made from the same plastic as the modules 17–19.

FIG. 3 shows that when the parts of valve 2 are assembled, the leg portion 61 of the flow diverter extends through bearing holes 25 and 26 into the interior of drain chamber 20 while the foot portion 62 remains entirely in the untreated liquid distribution chamber 32. The ledge 63 bears against hub 28, and a slick thrust bearing surface is provided by flat TEFLON washer 64. O-rings 76 in the grooves 27 seal around the leg portion 61. Holes 69 provide a liquid flow path from the hollow interior of flow diverter 60 to the drain chamber 20. The end surface 65 mates with the curved surface of wall 39, and O-ring 67 seal the hole 65. Entrance hole 66 is vertically positioned encompass holes 35. The edges 36 of holes 35 are rounded to minimize wear on O-ring 67.

Figure 14:
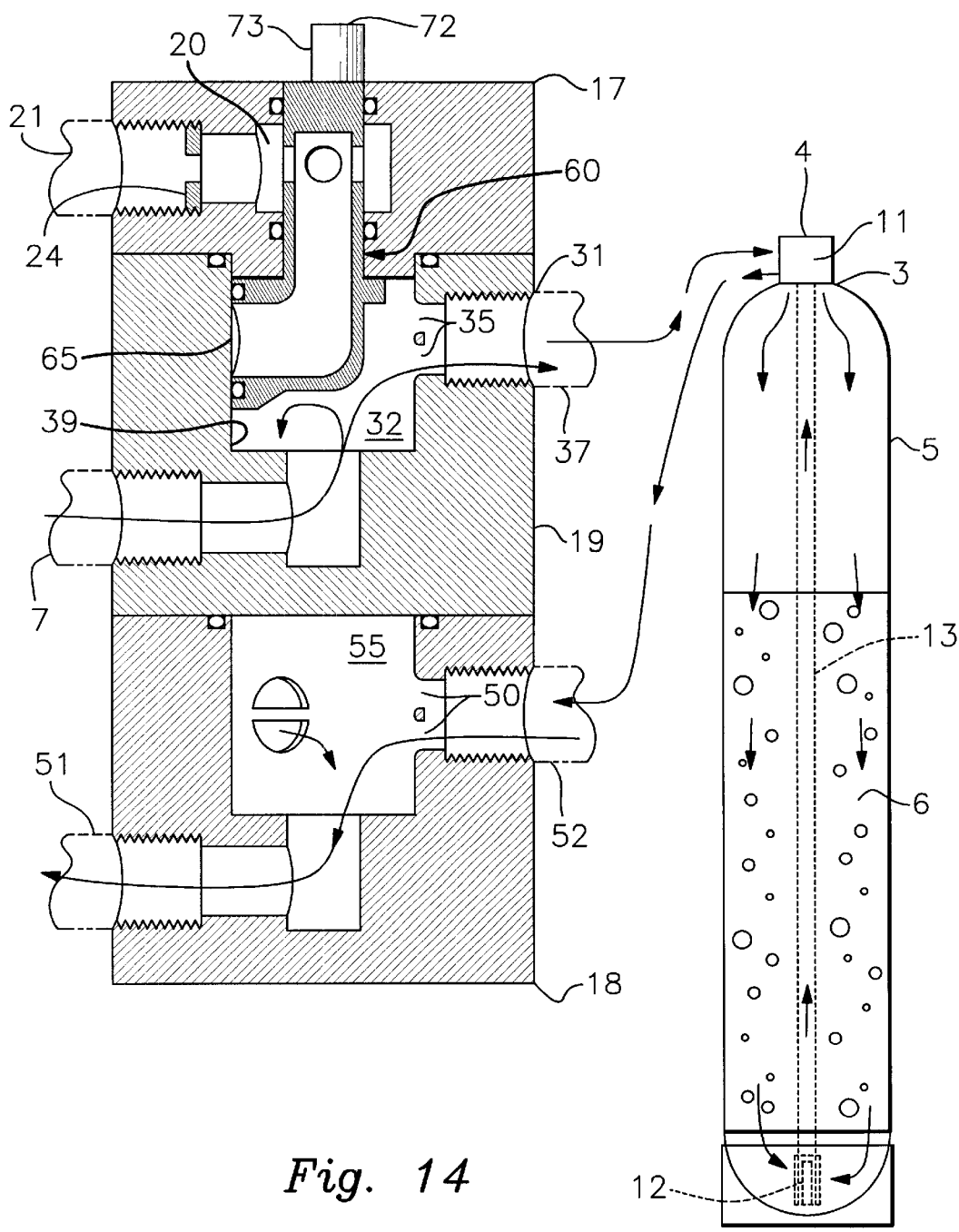
FIG. 14 is a schematic cross sectional side view showing the flow during the service cycle.

During the service cycle, as shown in FIG. 14, the end surface 65 of flow diverter member 60 contacts the interior wall surface 39 of chamber 32 at an inactive position located between the untreated liquid distribution ports 31. The seals and gaskets prevent any liquid from flowing into flow diverter member form either chamber 32 or chamber 20. Pressurized untreated liquid from line 7 flows into distribution chamber 32 and flows out through pipes 37 into the inlets 3 in the tops 11 of the filter units 5. The liquid flows through the beds 6 where impurities are removed. The treated liquid enters each strainer 12 and flows through pipe 13 and out of the filter outlet 4 to a treated liquid return line 52 and into treated liquid collection chamber 55. The treated liquid is available for service use through service outlet line 51.

Figure 15:
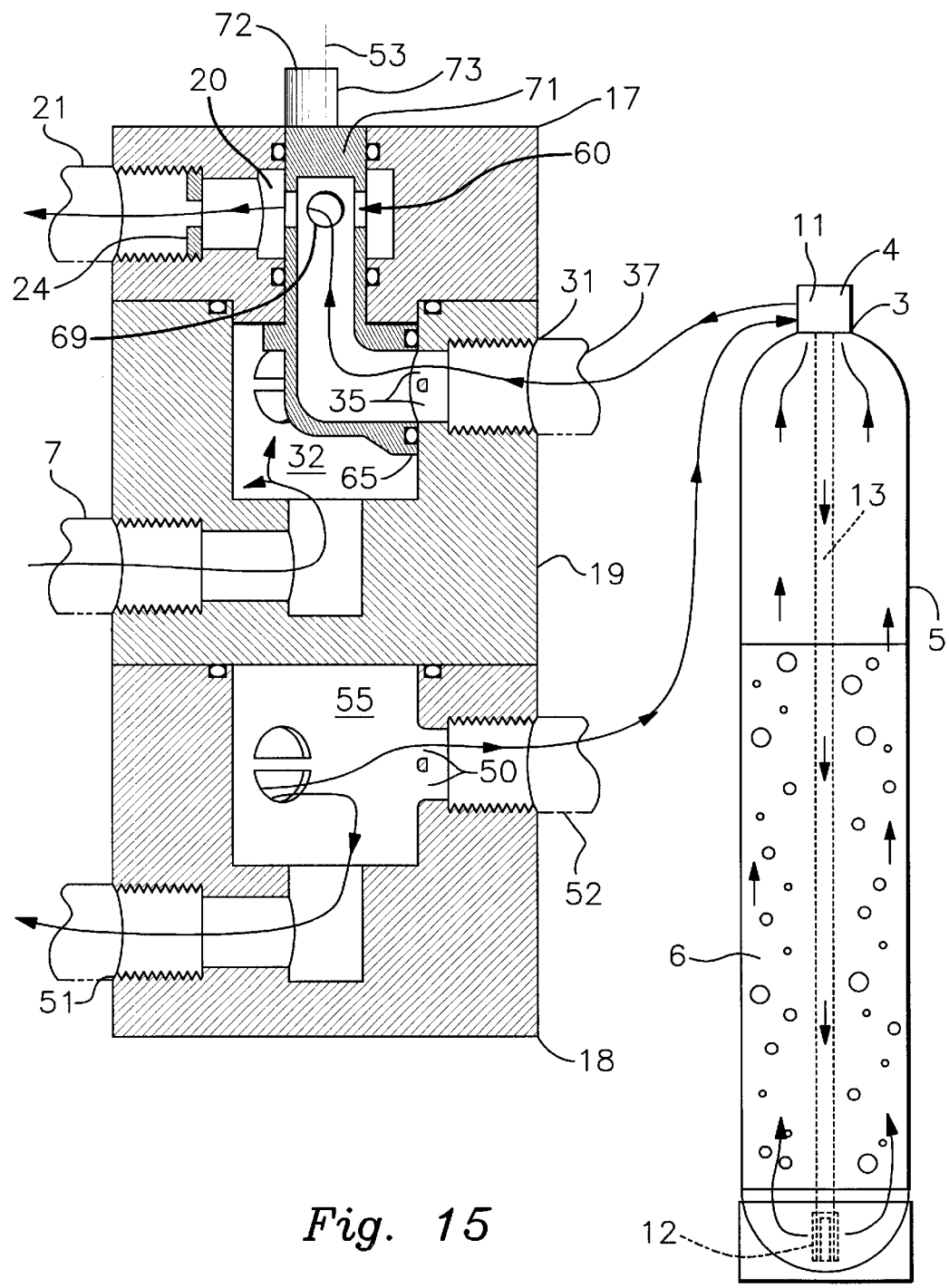
FIG. 15 is a schematic cross sectional side view showing flow during a backwash cycle.

The filter beds 6 must be backwashed periodically. In the preferred embodiment, iron is precipitated from potable water in a bed of Birm granules, which may be backwashed to remove the precipitated solids late each night when the demand for treated water is lowest. FIG. 15 shows the position of the flow diverter member 60 during a backwash cycle. The flow diverter member 60 has been rotated around the axis 53 by turning stem 72 until the diverter is aligned with a port 31 associated with a filter 5 that has been selected for backwashing. The diverter terminal end surface 65 has encompassed the holes 35 and sealed them from the water and pressure in chamber 32. The hollow interior of the flow diverter member is connected to the drain line 21 through its holes 69 and chamber 20. The result is that the pressure at the selected port 31 has been reduced to the essentially atmospheric pressure of the drain line 21. But the pipe 13 and strainer 12 at the bottom of bed 6 are still in fluid communication through a line 52 with the treated liquid chamber 55. The treated liquid collection chamber 55 is at the higher pressure of service line 51. This causes the treated water from treated liquid collection chamber 55 to reverse its flow direction through the line 52 of the selected filter unit so that the treated water enters the bed 6 through pipe 13 and strainer 12 and flows upwardly backwashing the bed 6. The backwash water flows out of the selected unit 5 through its inlet 4 and line 37 to the selected port 31. The flow continues through the selected port 31 and into the hollow interior of flow diverter member 60, out through the holes 69 into the chamber 20, and finally to disposal through drain line 21. Treated water continues to be available from line 51.

In the preferred embodiment, the backwash cycle for each unit takes about five minutes. After the first selected filter unit 5 has been backwashed, the flow diverter member 60 is rotated to the next selected filter unit 5. This moves the end surface 65 away from the holes 35 of the first selected filter unit, so the water flow and pressure at the port 31 of the first selected unit return to the service cycle values. The backwash cycle of the second selected filter unit is initiated by rotation of the end surface 65 into position surrounding the holes 35 of the second selected port 31 as shown in FIG. 15, and the backwash cycle continues as explained above. After the second selected filter unit has been backwashed, the flow diverter member 60 is rotated so as to encompass the holes 35 of the port 31 of the filter unit selected last, and the backwash cycle resumes as explained above. After all three filter units have been backwashed, the flow diverter member 60 is rotated to an inactive position between the ports 31 as shown in FIG. 14, and the full flow of treated liquid becomes available for service through line 51.

While the present invention has been described with reference to a particular embodiment, it is not intended to illustrate or describe all of the equivalent forms or ramifications thereof. Also, the words used are words of description rather than limitation, and various changes may be made without departing from the spirit or scope of the invention disclosed herein. It is intended that the appended claims cover all such changes as fall within the true spirit and scope of the invention.

I claim:

1. In liquid treatment apparatus comprising a plurality of separate discrete liquid treating units, each of said units containing liquid treating media which must be backwashed periodically, and each of said units having an untreated liquid inlet and a treated liquid outlet, with untreated liquid receiving treatment in each of said units by flowing from its untreated liquid inlet through said media in one direction, and treated liquid exiting from each of said units by flowing through its treated liquid outlet a single flow control valve comprising:

an untreated liquid distribution chamber having an inlet opening for connection to a source of pressurized untreated liquid, said liquid distribution chamber having a plurality of untreated liquid distribution ports, each liquid distribution port being connected to the untreated liquid inlet port of one of said units;

a treated liquid collection chamber having a plurality of treated liquid ports, each treated liquid port being connected to the treated liquid outlet of one Of said units, said liquid collection chamber having a service outlet opening for treated liquid flowing to service from said apparatus;

a drain chamber having a drain port connected to a drain at essentially atmospheric pressure, said untreated liquid distribution chamber and said treated liquid collection chamber and said drain chamber being sealed from each other; and a flow diverter member having one end in said drain chamber in continuous communication with said drain port, an other end of said flow diverter member being located in said liquid distribution chamber, said other end being pivotable selectively into connection with each of said liquid distribution ports so as to connect to said drain port a selected liquid distribution port and the liquid inlet port of a selected unit associated with said selected liquid distribution port while simultaneously sealing said selected liquid distribution port and the liquid inlet port of said selected unit from incoming untreated liquid in said liquid distribution chamber, and thereby reducing the pressure at the untreated liquid inlet of said selected unit to essentially atmospheric pressure so as cause treated liquid from said liquid collection chamber to flow through said selected unit to said drain port in a direction reverse to said one direction and thereby to backwash said media in said selected unit.

2. The liquid treatment apparatus defined in claim 1, wherein said single control valve comprises a unitary assembly having said drain chamber at one end, said treated liquid collection chamber at an opposite end, and said untreated liquid distribution chamber between said drain chamber and said treated liquid collection chamber, one wall of said untreated liquid distribution chamber being in contact with a wall of said drain chamber, and an opposite wall of said untreated liquid distribution chamber being in contact with a wall of said treated liquid collection chamber, and said flow diverter member extending through said one wall of said untreated liquid distribution chamber and said wall of said drain chamber.

3. The liquid treatment apparatus defined in claim 1, wherein said flow diverter member is generally L-shaped.

4. The liquid treatment apparatus defined in claim 3, wherein said generally L-shaped flow diverter member has a relatively long leg portion and a relatively short foot portion, said leg portion extending through one wall of said untreated liquid distribution chamber and through a wall of said drain chamber, and said foot portion being located entirely in said untreated liquid distribution chamber.

5. The liquid treatment apparatus defined in claim 4, wherein said L-shaped flow diverter member is a hollow tube, one end of said leg portion being closed, an end surface of said foot portion having an opening there through sized to encompass each of said liquid distribution ports, and holes in said leg portion located in said drain chamber providing a drain flow path for treated liquid that has entered said opening in said foot portion after said treated liquid has backwashed said media in said selected unit by flowing in said reverse direction.

6. The liquid treatment apparatus defined in claim 1, wherein said untreated liquid distribution chamber is hollow and has an interior wall surface with a right circular cylindrical curvature, and said flow diverter member having an end surface with a curvature identical to said curvature of said interior wall surface, and said end surface being in continuous contact with said interior wall surface.

7. The liquid treatment apparatus defined in claim 6, further comprising a water tight gasket in said end surface of said flow diverter member sealing said end surface against said interior wall surface of said untreated liquid distribution chamber.

8. Apparatus for treating potable water containing iron comprising means for pressurizing iron containing water to at least about 40 psi, means for dissolving at least about 6 ppm of oxygen in said iron containing water, a plurality of separate discrete iron removal filters, each of said filters containing a bed of iron removal granules which must be backwashed periodically, and each of said filters having an iron containing water inlet and a iron free water outlet, with said iron containing water receiving treatment in each of said filters by flowing from its iron containing water inlet through said bed of iron removal granules in one direction, and iron free water exiting from each of said filters by flowing through its iron free water outlet, and a single backwash flow control valve comprising:

an iron containing water distribution chamber having an inlet opening for connection to said means for pressurizing iron containing water, said iron containing water distribution chamber having a plurality of iron containing water distribution ports, each distribution port being connected to the iron containing water inlet port of one of said filters;

an iron free water collection chamber having a plurality of iron free water ports, each iron free water port being connected to the iron free water outlet of one of said filters, said water collection chamber having a service outlet opening for iron free water flowing to service from said apparatus;

a drain chamber having a drain port connected to a drain at essentially atmospheric pressure, said iron containing water distribution chamber and said iron containing water collection chamber and said drain chamber being sealed from each other; and a flow diverter member having one end in said drain chamber in continuous communication with said drain port, an other end of said flow diverter member being located in said water distribution chamber, said other end being pivotable selectively into connection with each of said water distribution ports so as to connect to said drain port a selected water distribution port and the water inlet port of a selected filter associated with said selected water distribution port while simultaneously sealing said selected water distribution port and said water inlet port of said selected filter from incoming iron containing water in said water distribution chamber, and thereby reducing the pressure at the iron containing water inlet of said selected filter to essentially atmospheric pressure so as to cause iron free water from said water collection chamber to flow through said selected filter to said drain port in a reverse direction to said one direction and thereby to backwash said Birm granules in said selected filter.

9. The apparatus for treating potable water containing iron defined in claim 8, having exactly three iron removal filters.

10. The apparatus for treating potable water containing iron defined in claim 8, wherein said single control valve comprises a unitary assembly having said drain chamber at one end, said iron free water collection chamber at an opposite end, and said iron containing water distribution chamber between said drain chamber and said iron free water collection chamber, one wall of said iron containing water distribution chamber being in contact with a wall of said drain chamber, and an opposite wall of said iron containing water distribution chamber being in contact with a wall of said iron free water collection chamber, and said flow diverter member being rotatable and extending through said one wall of said iron containing water distribution chamber and said wall of said drain chamber.

11. The apparatus for treating potable water containing iron defined in claim 8, wherein said flow diverter member is generally L-shaped.

12. The apparatus for treating potable water containing iron defined in claim 11, wherein said generally L-shaped flow diverter member has a relatively long leg portion and a relatively short foot portion, said leg portion extending through one wall of said iron containing water distribution chamber and through a wall of said drain chamber, and said foot portion being located entirely in said iron containing water distribution chamber.

13. The apparatus for treating potable water containing iron defined in claim 12, wherein said L-shaped flow diverter member is a hollow tube, one end of said leg portion being closed, an end surface of said foot portion having an opening there through sized to encompass each of said iron containing water distribution ports, and holes in said stem portion located in said drain chamber providing a drain flow path for iron free water that has entered said opening in said foot portion after said iron free water has backwashed said Birm granules in said selected filter by flowing in said reverse direction.

14. The apparatus for treating potable water containing iron defined in claim 8, wherein said iron containing water distribution chamber is hollow and has an interior wall surface with a right circular cylindrical curvature, and said flow diverter member having an end surface with a curvature identical to said curvature of said interior wall surface, and said end surface being in continuous contact with said interior wall surface.

15. The apparatus for treating potable water containing iron defined in claim 14, further comprising a water tight gasket in said end surface of said flow diverter member sealing said end surface against said interior wall surface of said iron containing water distribution chamber.

16. Apparatus for treating potable water containing iron comprising means for pressurizing untreated iron containing water to at least about 40 psi, means for dissolving at least about 6 ppm of oxygen in said iron containing water, exactly three separate discrete iron removal filters, each of said filters containing a bed of about ¾ to 2 cubic feet of iron removal granules which must be backwashed periodically, and each of said filters having an untreated iron containing water inlet and a treated iron free water outlet, with said iron containing water receiving treatment in each of said filters by flowing from its iron containing water inlet through said bed of iron removal granules in one direction, and iron free water exiting from each of said filters by flowing through its iron free water outlet, and a single integral backwash water flow control valve comprising:

a hollow treated iron free water collection module at one end, said treated iron free water collection module having a cylindrical treated iron free water collection chamber at its center and a plurality of symmetrically spaced treated iron free water collection ports around its periphery and a treated iron free water service outlet port, all of the ports in said treated iron free water collection module communicating with said treated iron free water collection chamber;

a hollow drain module at an opposite end of said valve, said drain module having a drain chamber at its center and a drain outlet port at essentially atmospheric pressure communicating with said drain outlet chamber;

an untreated iron containing water distribution module located between said drain module and said treated iron free water collection module, said untreated iron containing water distribution module having an untreated iron containing water distribution chamber at its center, a plurality of symmetrically spaced untreated iron containing water distribution ports around its periphery, and an untreated iron containing water inlet port, said untreated iron containing water distribution chamber having a right circular cylindrical interior wall surface curvature;

said modules all being concentrically and axially aligned along a common longitudinal central axis and said modules being immovably attached to each other, said untreated iron containing water distribution module having one wall contacting a wall of said treated iron free water collection module and an opposite wall contacting a wall of said drain module, there being identical aligned holes in said wall of said drain module and said one wall of said untreated iron containing water distribution module;

a hollow tubular generally L-shaped flow diverter having a relatively long leg portion and a relatively short foot portion, said leg portion extending through said aligned holes and having an end in said drain chamber that is perforated, said foot portion having an open end located entirely in said untreated iron containing water distribution chamber; said open end of said flow diverter having a terminal end surface curved to mate with the cylindrical curvature of said interior wall surface of said untreated iron containing water distribution chamber, and said curved terminal end surface being in continuous contact with said interior wall of said untreated iron containing water distribution chamber, said open end of said foot portion having an opening there through sized to selectively encompass and thereby selectively isolate each of said untreated iron containing water distribution ports, and a water tight gasket in said curved surface of said flow diverter sealing said open end surface against said interior wall surface of said untreated iron containing water distribution chamber, a plug closing said end of said leg of said flow diverter, an integral portion of said plug extending from said valve so as to provide a stem for rotating said flow diverter, said flow diverter being pivotable selectively by rotation of said stem into connection with each of said untreated iron containing water distribution ports so as to connect to said drain port a selected untreated iron containing water distribution port and the untreated iron containing water inlet port of a selected filter associated with said selected untreated iron containing water distribution port while simultaneously sealing said selected untreated iron containing water distribution port and said untreated iron containing water inlet port of said selected filter from incoming untreated iron containing water in said untreated iron containing water distribution chamber, and thereby reducing the pressure at the untreated iron containing water inlet port of said selected filter to essentially atmospheric pressure so as to cause treated iron free water from said treated iron free water collection chamber to flow through said selected filter to said drain port in a reverse direction to said one direction and thereby to backwash said iron removal granules in said selected filter.

17. Apparatus for treating potable water containing iron comprising separate discrete water treating units, each of said units containing iron removal granules which must be backwashed periodically, and each of said units having an untreated water inlet and a treated water outlet, with untreated water receiving treatment in each of said units by flowing from its untreated water inlet through said granules in one direction, and treated water exiting from each of said units by flowing through its treated water outlet, a flow control valve comprising:
an untreated water distribution chamber having an inlet opening for connection to a source of pressurized untreated water, said water distribution chamber having a plurality of untreated water distribution ports, each water distribution port being connected to the untreated water inlet port of one of said units;
a treated water collection chamber having a plurality of treated water ports, each treated water port being connected to the treated water outlet of one of said units, said water collection chamber having a service outlet opening for treated water flowing to service from said apparatus;
a drain chamber having a drain port connected to a drain at essentially atmospheric pressure, said untreated water distribution chamber and said treated water collection chamber and said drain chamber being sealed from each other; and
a flow diverter having one end in said drain chamber in continuous communication with said drain port, an other end of said flow diverter being located in said water distribution chamber, said other end being pivotable selectively into connection with each of said water distribution ports so as to connect to said drain port a selected water distribution port and the water inlet port of a selected unit associated with said selected water distribution port while simultaneously sealing said selected water distribution port and the water inlet port of said selected unit from incoming untreated water in said water distribution chamber, and thereby reducing the pressure at the untreated water inlet of said selected unit to essentially atmospheric pressure so as cause treated water from said water collection chamber to flow through said selected unit to said drain port in a direction reverse to said one direction and thereby to backwash said iron removal granules in said selected unit.

18. The potable water treatment apparatus defined in claim 17, wherein said flow diverter is generally L-shaped.

19. The potable water treatment apparatus defined in claim 17, wherein said untreated water distribution chamber is hollow and has an interior wall surface with a circular curvature, and said flow diverter has an end surface with a curvature identical to said curvature of said interior wall surface, and said end surface is in continuous contact with said interior wall surface.

20. The potable water treatment apparatus defined in claim 19, further comprising a water tight gasket in said end surface of said flow diverter sealing said end surface against said interior wall surface of said untreated water distribution chamber.

* * * * *